(12) United States Patent
Seiffert

(10) Patent No.: US 12,496,256 B2
(45) Date of Patent: Dec. 16, 2025

(54) PRESCRIPTION DRUG BOTTLE MEASURING DEVICE AND METHOD OF USE

(71) Applicant: Express Scripts Strategic Development, Inc., St. Louis, MO (US)

(72) Inventor: Andrew J. Seiffert, O'Fallon, MO (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 33 days.

(21) Appl. No.: 18/537,962

(22) Filed: Dec. 13, 2023

(65) Prior Publication Data

US 2025/0195332 A1     Jun. 19, 2025

(51) Int. Cl.
A61J 1/18    (2023.01)
A61J 1/16    (2023.01)
A61J 1/20    (2006.01)

(52) U.S. Cl.
CPC . *A61J 1/18* (2013.01); *A61J 1/16* (2013.01); *A61J 1/2089* (2013.01); *A61J 2200/74* (2013.01); *A61J 2200/76* (2013.01)

(58) Field of Classification Search
CPC A61J 1/16; A61J 2200/76; B65B 3/00; B65B 67/12
See application file for complete search history.

(56) References Cited

U.S. PATENT DOCUMENTS

| | | | |
|---|---|---|---|
| 6,334,471 B1 * | 1/2002 | Graffin | G01G 13/2851 141/83 |
| 7,137,485 B2 | 11/2006 | Bärneman | |
| 7,284,576 B1 * | 10/2007 | Yacko | B67D 7/348 141/83 |
| 8,408,257 B2 | 4/2013 | Ono | |
| 9,044,903 B2 | 6/2015 | Nakao | |
| 9,133,007 B2 | 9/2015 | Clüsserath | |
| 9,480,351 B2 | 11/2016 | Nielsen | |
| 9,700,487 B2 | 7/2017 | Imai | |
| 9,801,785 B2 | 10/2017 | Fukuda | |
| 10,029,260 B2 * | 7/2018 | King | B01L 9/06 |
| 10,466,152 B2 | 11/2019 | Gillette, II | |
| 11,346,853 B2 * | 5/2022 | Oda | G01N 35/00732 |
| 11,378,435 B2 * | 7/2022 | Amendt | B01L 9/06 |
| 11,987,410 B2 * | 5/2024 | Gutierro Aduriz | B65B 61/00 |
| 2008/0256899 A2 | 10/2008 | Duffy | |
| 2010/0147784 A1 * | 6/2010 | Rivero | A47B 73/00 211/74 |

(Continued)

FOREIGN PATENT DOCUMENTS

| | | | |
|---|---|---|---|
| CN | 216783928 U | * | 6/2022 |
| CN | 216887307 U | * | 7/2022 |
| JP | 2012187437 A | | 10/2012 |

*Primary Examiner* — Timothy L Maust
(74) *Attorney, Agent, or Firm* — Dickinson Wright PLLC

(57) ABSTRACT

The bottle measuring device includes a jig that has a floor. At least one wall extends upwardly from the floor and partially surrounds a bottle receiving space. The jig also includes a plurality of measurement markers that are spaced vertically apart from one another on the at least one wall to indicate a fill level of the bottle when the bottle is in the bottle receiving space of the jig. The bottle measuring device can be used during filling of a medication bottle in a pharmacy setting.

20 Claims, 9 Drawing Sheets

(56) References Cited

U.S. PATENT DOCUMENTS

| | | | |
|---|---|---|---|
| 2014/0080149 A1* | 3/2014 | Goehde | G01N 33/54326 |
| | | | 435/287.2 |
| 2014/0134557 A1 | 5/2014 | Hanzawa | |
| 2014/0331595 A1 | 11/2014 | Seaver | |
| 2016/0326051 A1 | 11/2016 | Kim | |
| 2023/0126344 A1 | 4/2023 | Swindells | |
| 2023/0130332 A1 | 4/2023 | Swindells | |
| 2023/0240943 A1 | 8/2023 | Perano | |

* cited by examiner

PRESCRIPTION DRUG BOTTLE MEASURING DEVICE AND METHOD OF USE

FIELD

The present disclosure relates generally to the technical field of high-volume fulfillment centers (e.g., a high-volume pharmacies, etc.) and to systems and methods for handling medication containers in such fulfillment centers.

BACKGROUND

The background description provided here is for the purpose of generally presenting the context of the disclosure. Work of the presently named inventors, to the extent it is described in this background section, as well as aspects of the description that cannot otherwise qualify as prior art at the time of filing, are neither expressly nor impliedly admitted as prior art against the present disclosure.

An automated pharmacy can process and fill a large number of prescriptions and prescription orders. Automated systems can be used by a high-volume pharmacy to process and fulfill prescriptions.

Mail order pharmacies provide a convenient and cost-effective option for patients to receive prescription drugs. For example, a mail order pharmacy can be capable of taking advantage of economies of scale, volume dispensing of prescription drugs, and centralized warehousing and shipping to reduce the cost of prescription drugs purchased by patients of the mail order pharmacy. Some types of prescription drugs can have temperature-related storage and handling requirements in order to maintain the safety and efficacy of the drugs.

SUMMARY

One aspect of the present disclosure is related to a bottle measuring device for measuring a volume of a liquid medication in a bottle during a filling process. The bottle measuring device includes a jig that has a floor. At least one wall extends upwardly from the floor and partially surrounds a bottle receiving space. The jig also includes a plurality of measurement markers that are spaced vertically apart from one another on the at least one wall to indicate a fill level of the bottle when the bottle is in the bottle receiving space of the jig.

According to another aspect of the present disclosure, the floor of the jig includes at least one light for illuminating the liquid medication in the bottle during the filling process.

According to yet another aspect of the present disclosure, the floor has a rectangular shape, and the at least one wall includes three planar walls that are arranged along and extend vertically upwardly from a portion of a periphery the floor.

According to still another aspect of the present disclosure, the three planar walls include two full walls that extend along full lengths of respective sides of the floor and a partial wall that extends along a partial length of a respective side of the floor.

According to a further aspect of the present disclosure, the full walls include windows to allow the bottle to be viewed through the full walls.

According to yet a further aspect of the present disclosure, the measurement markings are located on all of the walls.

According to still a further aspect of the present disclosure, the floor of the jig has a recess that has similar dimensions to a bottom of the bottle.

According to another aspect of the present disclosure, the jig further includes a ledge that extends vertically upwardly from the floor and surrounds a portion of the floor that does not include the walls.

According to yet another aspect of the present disclosure, the floor of the jig further includes a scale.

According to still another aspect of the present disclosure, the scale is in electrical communication with a controller. The controller is configured to automatically trigger an alert on an alert device in response to a weight on the scaling equaling or exceeding a desired weight associated with the bottle when the bottle is filled with the liquid medication to a predetermined level.

Another aspect of the present disclosure is related to a method of filling a medication bottle with a liquid medication. The method includes the step of inserting an empty bottle into a bottle receiving space of a jig. The jig has a floor and at least one wall that extends upwardly from the floor and partially surrounds the bottle receiving space. A plurality of measurement markers are spaced vertically apart from one another on the at least one wall to indicate a fill level of the bottle when the bottle is in the bottle receiving space of the jig. The method proceeds with the step of pouring the liquid medication into the bottle in the bottle receiving space of the jig. The method continues with the step of comparing a fluid level of the liquid medication to the plurality of measurement markers to determine a volume of the liquid medication in the bottle.

According to another aspect of the present disclosure, the floor includes at least one light. The method includes the step of projecting light through a bottom of the bottle to illuminate the liquid medication in the bottle.

According to yet another aspect of the present disclosure, the floor has a rectangular shape with four sides. The at least one wall includes two full walls that extend along respective sides of the floor. The at least one wall also includes a partial wall that extends along a portion of another respective side of the floor.

According to still another aspect of the present disclosure, the floor includes a recess that has a similar profile to a bottom of the bottle.

Yet another aspect of the present disclosure is related to a pharmacy that includes a bottle filling area. The bottle filling area include at least one jig. The jig has a floor and at least one wall that extends upwardly from the floor and partially surrounds the bottle receiving space. A plurality of measurement markers are spaced vertically apart from one another on the at least one wall to indicate a fill level of the bottle when the bottle is in the bottle receiving space of the jig. At least one bottle is in the bottle filling area and is shaped to be received in the bottle receiving space.

According to another aspect of the present disclosure, the floor of the jig includes at least one light for illuminating the liquid medication in the bottle during the filling process.

According to yet another aspect of the present disclosure, the floor has a rectangular shape, and the at least one wall includes three planar walls arranged along and extending vertically upwardly from a portion of a periphery the floor.

According to still another aspect of the present disclosure, the three planar walls include two full walls that extend along full lengths of respective sides of the floor and a partial wall that extends along a partial length of a respective side of the floor.

According to a further aspect of the present disclosure, the measurement markings are located on all of the walls.

According to yet a further aspect of the present disclosure, the floor of the jig includes a scale. The scale is in electrical communication with a controller, and the controller is configured to automatically trigger an alert on an alert device in response to a weight on the scaling equaling or exceeding a desired weight associated with the bottle when the bottle is filled with the liquid medication to a predetermined level.

BRIEF DESCRIPTION OF THE DRAWINGS

The present disclosure will become more fully understood from the detailed description and the accompanying drawings.

In the drawings, reference numbers can be reused to identify similar and/or identical elements.

DETAILED DESCRIPTION

Figure 1:
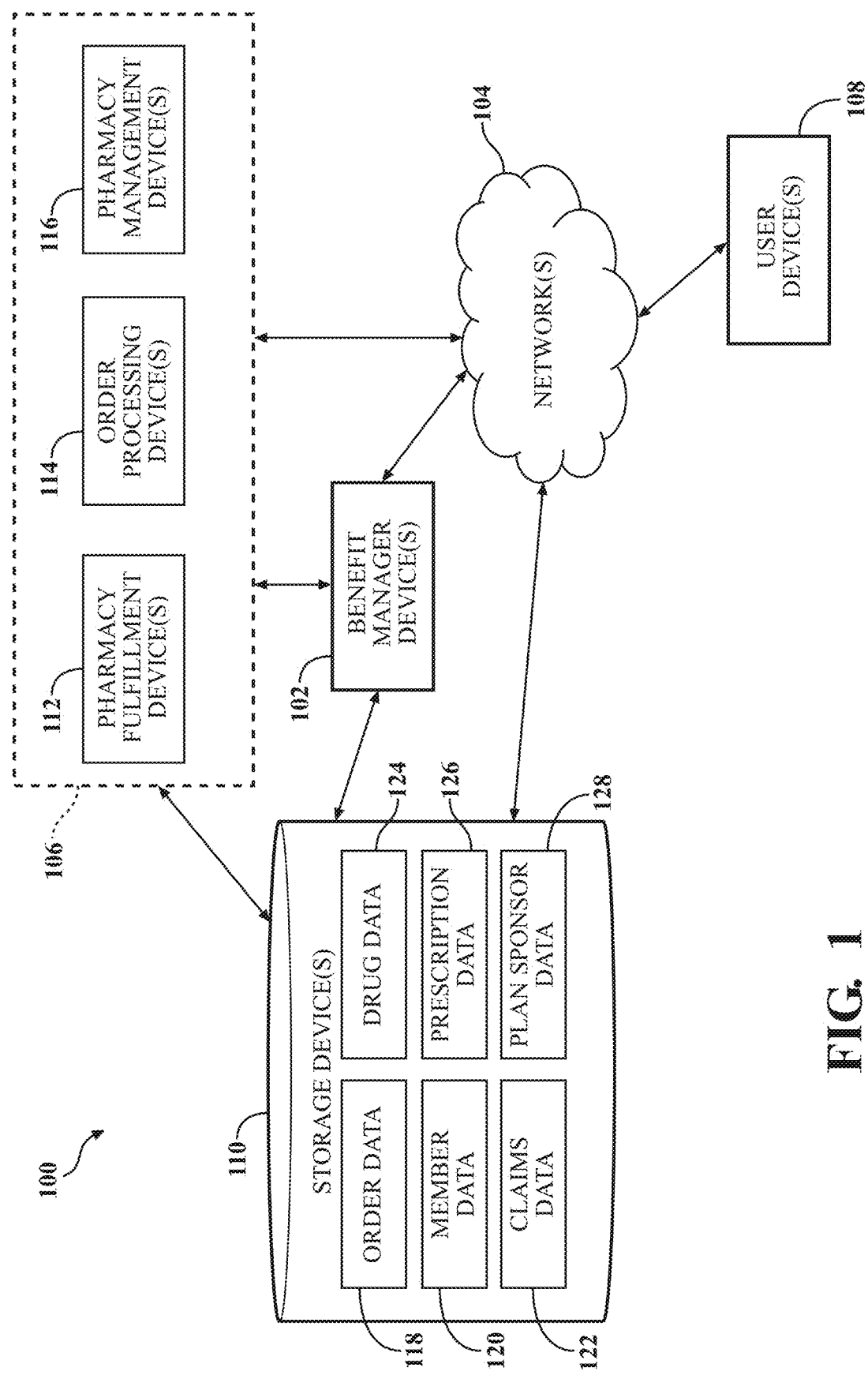
FIG. 1 is a block diagram of an example system according to an example embodiment.

A high-volume pharmacy may be a pharmacy that is capable of filling prescriptions automatically, mechanically, manually, or a combination thereof. The system 100 and/or the components thereof may otherwise be deployed in a lower volume pharmacy. The pharmacy may also fill prescription orders including highly regulated drugs in a secure manner.

The system 100 may include a benefit manager device 102, a pharmacy device 106, and a user device 108, which may communicate either directly and/or over a network 104. The system may also include a storage device 110.

The benefit manager device 102 is a device operated by an entity that is at least partially responsible for creation and/or management of the pharmacy or drug benefit. While such an entity operating the benefit manager device 102 is typically a pharmacy benefit manager (PBM), other entities may operate the benefit manager device 102 either on behalf of themselves, the PBM, another entity, or other entities. For example, the benefit manager device 102 may be operated by a health plan, a retail pharmacy chain, a drug wholesaler, a data analytics or other type of software-related company, or the like. In some embodiments, a PBM that provides the pharmacy benefit may also provide one or more than one additional benefit including a medical or health benefit; a dental benefit; a vision benefit; a radiology benefit; a pet care benefit; an insurance benefit; a long-term care benefit; a nursing home benefit; and the like. The PBM may, in addition to its PBM operations, operate one or more than one pharmacy.

Some of the operations of the PBM that operates the benefit manager device 102 may include the following activities and processes. A member (or a person on behalf of the member) of a pharmacy benefit plan administered by or through the PBM attempts to obtain a prescription drug at a retail pharmacy location (e.g., a location of a physical store) from a pharmacist or a pharmacist technician. The member may also attempt to obtain the prescription drug through mail order drug delivery, from a mail order pharmacy location, which may be the high-volume pharmacy system 100. In some embodiments, the member may also attempt to obtain the prescription drug directly or indirectly through the use of a machine, such as a kiosk, vending unit, mobile electronic device, or a different type of mechanical electrical, electronic communication device, and/or computing device. Such a machine may be filled with the prescription drug in prescription packaging, which may include multiple prescription components, prepared by the high-volume pharmacy system 100.

The member may have a copayment for the prescription drug that reflects an amount of money that the member is responsible to pay the pharmacy for the prescription drug. The money paid by the member to the pharmacy may come from personal funds of the member, a health savings account (HSA) of the member or the member's family, a health reimbursement arrangement (HRA) of the member or the member's family, a flexible spending account (FSA) of the member or the member's family, or the like. In some instances, an employer of the member may directly or indirectly fund or reimburse the member for the copayments.

The amount of the co-pay required form the member may vary with different pharmacy benefit plans having different plan sponsors or clients and/or prescription drugs. The member's copayment may be based on a flat copayment (e.g., $10), co- insurance (e.g., 10%), and/or a deductible (e.g., for first $500 of annual prescription drug expenses) for certain prescription drugs, certain types and/or classes of prescription drugs, and/or all prescription drugs. The copayment may be stored in the storage 110 or determined by the benefit manager device 102.

In some instances, the member may not pay the copayment or may only pay a portion of the copayment for the prescription drug. For example, if the usual and customary cost for a generic version of a prescription drug is $4, and the member's flat copayment is $20 for the prescription drug, the member may only be required to pay $4 to receive the prescription drug. In another example involving a worker's compensation claim, no copayment may be due by the member for the prescription drug.

In addition, copayments may also vary based on different delivery channels used for the prescription drug to be received by the member. For example, the copayment for receiving the prescription drug from a mail order pharmacy location may be less than the copayment for receiving the prescription drug from a retail pharmacy location. Such a co-payment may change depending on whether a prescription is filled manually or through at least partially automated fulfillment processes as described herein In conjunction with receiving the copayment (if any) from the member and dispensing the prescription drug to the member, the pharmacy submits a claim to the PBM for the prescription drug. After receiving the PBM (e.g., through the benefit manager device 102) may perform certain adjudication operations including verifying eligibility for the member, identifying and/or reviewing an applicable formulary for the member to determine any appropriate copayment, coinsurance, and deductible for the prescription drug, and performing a drug utilization review (DUR) on the member. The PBM provides a response to the pharmacy (e.g., from the benefit manager device 102 to the pharmacy device 106) following performance of at least some of the operations mentioned herein. For example, the PBM can route the prescription order to an automated pharmacy fulfillment system as described herein.

As part of the adjudication, a plan sponsor (or the PBM on behalf of the plan sponsor) ultimately reimburses the pharmacy for filling the prescription drug when the prescription drug was successfully adjudicated.

The aforementioned adjudication operations generally occur before the copayment is received and the prescription drug is dispensed. However, in some instances these operations may occur simultaneously, substantially simultaneously, or in a different order. In addition, more or less adjudication operations may be performed as at least part of the adjudication process.

The amount of reimbursement paid to the pharmacy by a plan sponsor and/or money paid by the member may be determined at least partially based on the type(s) of pharmacy network in which the pharmacy is included. Other factors may also be used to determine the amount in addition to the type of pharmacy network. For example, if the member pays the pharmacy for the prescription drug without the prescription drug benefit provided by the PBM (e.g., by paying cash without use of the prescription drug benefit or by use of a so-called pharmacy discount card offering other negotiated rates), the amount of money paid by the member may be different than when the member uses prescription or drug benefit. In some embodiments, the amount of money received by the pharmacy for dispensing the prescription drug and for the prescription drug itself may be higher than when the member uses the prescription or drug benefit. Some or all of the foregoing operations may be performed by executing instructions stored on the benefit manager device 102 and/or an additional device.

Examples of the network 104 include Mobile Communications (GSM) network, a code division multiple access (CDMA) network, 3rd Generation Partnership Project (3GPP) network, an Internet Protocol (IP) network, a Wireless Application Protocol (WAP) network, a WiFi network, or an IEEE 802.11 standards network, as well as various combinations thereof. The network 104 may include an optical communication network. The network 104 may be a local area network or a global communication network, such as the Internet. In some embodiments, the network 104 may include a network dedicated to prescription orders, e.g., a prescribing network such as the electronic prescribing network operated by Surescripts of Arlington, Virginia.

Moreover, although the system shows a single network 104, multiple networks can be used. The multiple networks may communicate in series with each other to link the devices 102, 106-110 or in parallel to link the devices 102, 106-110.

The pharmacy device 106 may include an order processing device 114, a pharmacy manager device 116, and a pharmacy fulfillment device 112 in communication with each other directly and/or over the network 104.

The order processing device 114 may receive information regarding filling prescriptions and may direct an order component to one or more than one of the devices of the pharmacy fulfillment device 112 at a pharmacy. The pharmacy fulfillment device 112 may fulfill, dispense, aggregate, and/or pack the order components of the prescription drugs in accordance with one or more than one of the prescription orders directed by the order processing device 114. The order processing device 114 may be deployed in the system 100 or may otherwise be used. The pharmacy fulfillment device 112 may include an item dispenser that includes a door as described herein. The door may include devices to stage groups of items, e.g., medication, small solids, or the like, for dispensing into an appropriate container. The containers can be tracked in the pharmacy fulfillment device 112 and/or the order processing device 114. The door may include apertures, openings or slots through which power lines can extend from inside the door to outside the door to allow movement of the door and maintenance of the door without completely disconnecting all bundled lines in the door. In an example embodiment, the pharmacy fulfillment device 112 can include the shuttle and at least partially automated fulfillment system and methods as described herein.

In general, the order processing device 114 is a device located within or otherwise associated with the pharmacy to enable fulfillment of a prescription and dispensing prescription drugs by the pharmacy fulfilment device 112. In some embodiments, the order processing device 114 may be an external device separate from the pharmacy and communicate with other devices located within the pharmacy. In an example embodiment, the order processing device 114 can include shuttle operations as described in U.S. Provisional Patent Nos. 63/272,667 and 63/272,671, which are hereby incorporated by reference.

For example, the external order processing device 114 may communicate with an internal order processing device 114 and/or other devices located within the system 100. In some embodiments, the external order processing device 114 may have limited functionality (e.g., as operated by a patient requesting fulfillment of a prescription drug), while the internal pharmacy order processing device 114 may have greater functionality (e.g., as operated by a pharmacist).

The order processing device 114 may track the prescription order as it is fulfilled by the pharmacy fulfillment device 112, inclusive of tracking the shuttle, the container on the shuttle and objects being placed in the container. The prescription order may include one or more than one prescription drugs to be filled by the pharmacy. The order processing device 114 may make pharmacy routing decisions and/or order consolidation decisions for the particular prescription order. The pharmacy routing decisions may include what device(s) in the pharmacy are responsible for filling or otherwise handling certain portions of the prescription order. The order consolidation decisions include whether portions of one prescription order or multiple prescription orders should be shipped together for a patient or a patient family. The order processing device 114 may also track and/or schedule literature or paperwork associated with each prescription order or multiple prescription orders that are being shipped together. The order processing device 114 may also control track operations and direct an individual shuttle to a specific location in the fulfillment center such that a specific object can be placed in the container or select tasks can be performed at workstations.

The pharmacy management device 116 may enable and/or facilitate management and operations in a pharmacy. For example, the pharmacy management device 116 may provide functionality to enable receipt and processing of prescription drug claims, management of pharmacy personnel, management of pharmaceutical and non-pharmaceutical products, track products in the pharmacy, record workplace incidents involve personnel and products, and the like. In some embodiments, the order processing device 114 may operate in combination with the pharmacy management device 116.

In some embodiments, the pharmacy management device 116 may be a device associated with a retail pharmacy location (e.g., exclusive pharmacy location, a grocery store with a retail pharmacy, or a general sales store with a retail pharmacy) or other type of pharmacy location at which a member attempts to obtain a prescription. The pharmacy management device 116 may be utilized by the pharmacy to submit the claim to the PBM (e.g., through the benefit management device 102) for adjudication.

In some embodiments, the pharmacy management device 116 may enable information exchange between the pharmacy and the PBM, for example, to allow the sharing of member information such as drug history, and the like, that may allow the pharmacy to better service a member (e.g., by providing more informed therapy consultation and drug interaction information, etc.). In some embodiments, the benefit manager 102 may track prescription drug fulfillment and/or other information for patients that are not members or have not identified themselves as members, at the time (or in conjunction with the time) in which they seek to have a prescription filled at a pharmacy.

The pharmacy fulfillment devices 112, the order processing device 114, and/or the pharmacy management device 116 may include circuitry, a processor, a memory to store data and instructions, and communication functionality. These devices 112-116, in some embodiments are dedicated to performing processes, methods and/or instructions described herein. Other types of electronic devices specifically configured to implement with the processes, methods and/or instructions described herein may also be used.

In some embodiments, at least some functionality of the order processing device 114 may be included in the pharmacy management device 116 may include circuitry, a processor, a memory to store data and instructions, and communication functionality. These devices 112-116, in some embodiments, are dedicated to performing processes, methods and/or instructions described herein. Other types of electronic devices specifically configured to implement with the processes, methods and/or instructions described herein may also be used.

In some embodiments, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (e.g., by utilizing a local storage) and/or through the network 104 (e.g., by utilizing a cloud configuration or software as a service, etc.) with the storage 110.

The user device 108 is used by a device operator. The device operator may be a user (e.g., an employee, a contractor, a benefit member, a patient of the pharmacy, or the like) associated with the system 100. Other device operators may also operate the user device 108. In some embodiments, the user device 108 may enable the device operator to attend to pharmacy operations in a convenient manner (e.g., remote from a pharmacy). In some embodiments, the user device 108 may enable the device operator to receive information about pharmacy processes, prescription drug fulfillment status, and the like.

The user device 108 may be a stand-alone device that solely provides at least some of the functionality of the methods and systems or may be a multi-use device that has functionality outside off analysis of the methods and systems. In some embodiments, the computing system may include a mobile computing device. For example, the user device 108 may include a mobile electronic device, such as an iPhone or iPad by Apple, Inc., and mobile electronic devices powered by Android by Google, Inc. The user device 108 may also include other computing devices, such as desktop computing devices, notebook computing devices, netbook computing devices, gaming devices, and the like. Other types of electronic devices may also be used. The user device 108 running an application becomes a dedicated device when executing the application.

The storage device 110 may include: a non-transitory storage (e.g., memory, hard disk, CD-ROM, and the like) in communication with the benefit manager device 102, the pharmacy device 106, and/or the user device 108 directly and/or over the network 104. The non-transitory storage may store order data 118, member 120, claims data 122, drug data 124, prescription data 126, and/or plan sponsor 128. Further, the system 100 may include additional devices, which may communicate with each other directly or over the network 104.

The order data 118 may be related to a prescription order. The order data may include the type of the prescription drug (e.g., drug name and strength) and quantity of the prescription drug. The order data 118 may also include data used for completion of the prescription, such as prescription materials and/or the type and/or size of container in which the drug is dispensed or in which is requested to be dispensed. In general, prescription materials include an electronic copy of information regarding the prescription drug for inclusion with or otherwise provided (e.g., via email) in conjunction with the fulfilled prescription. The prescription materials may include electronic information regarding drug interaction warnings, recommended usage possible side effects, expiration date, date of prescribing, or the like. The order data 118 may be used by the pharmacy to fulfill a pharmacy order.

In some embodiments, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (e.g., a prescription bottle and sealing lid, prescription packaging, and the like) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information, such as bar code data read from pallets, bins, trays, carts, and the like used to facilitate transportation of prescriptions within the pharmacy may also be stored as order data 118.

The member data 120 includes information regarding the members associated with the PBM. The information stored as member data 120 may include personal information, personal health information, protected health information, fitness data, health data, web and mobile app activity, and the like. Examples of the member data 120 include name, address, telephone number, e-mail address, prescription drug history, and the like. The member data 120 may include a plan sponsor identifier that identifies the plan sponsor associated with the member and/or a member identifier that identifies the member to the plan sponsor. The member data 120 may also include, by way of example, dispensation preferences such as type of label, type of cap, message preferences, language preferences, or the like.

The member data 120 may be accessed by various devices in the pharmacy to obtain information utilized for fulfillment and shipping of prescription orders. In some embodiments, an external order processing device 114 operated by or on behalf of a member may have access to at least a portion of the member data 120 for review, verification, or other purposes.

In some embodiments, the member data 120 may include information for persons who are patients of the pharmacy but are not members in a pharmacy benefit plan being provided by the PBM. For example, these patients may obtain drugs directly from the pharmacy, through a private label service offered by the pharmacy, or otherwise. In general, the use of the terms member (e.g., of a prescription drug benefit plan) and patient (e.g., of a pharmacy) may be used interchangeably in this disclosure.

The claims data 122 includes information regarding pharmacy claims adjusted by the PBM under a drug benefit program provided by the PBM for one, or more than one, plan sponsor. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number), the dispensing date, generic indicator, GPI number, medication class, the cost of the prescription drug provided under the drug benefit program, the copay/coinsurance amount, rebate information, and/or member eligibility, and the like. The claims data can also include the number of bottles into which a liquid drug is split using the systems and methods described herein, e.g., using the jig. Additional information may be included.

In some embodiments, other types of claims beyond prescription drug claims may be stored in the claims data 122. For example, medical claims, dental claims, wellness claims, or other types of health care-related claims for members may be stored as a portion of the claims data.

In some embodiments, the claims data 122 includes claims that identify the members with whom the claims are associated. In some embodiments, the claims data 122 includes claims that have been de-identified (e.g., associated with a unique identifier but not with a particular, identifiable member), aggregated, and/or otherwise processed.

The drug data 124 may include drug name (e.g., technical name and/or common name), other names by which the drug is known by, active ingredients, an image of the drug (e.g., in pill form), an image of the initial level in a split bottle, the color of a liquid drug, and the like. The drug data 124 may include information associated with a single medication or multiple medications.

The prescription data 126 may include information regarding prescriptions that may be issued by prescribers on behalf of patients, who may be members of the pharmacy benefit plan, for example to be filled by a pharmacy. Examples of the prescription data 126 include patient names, medication or treatment (such as lab tests), dosing information, and the like. The prescriptions may be electronic prescriptions, paper prescriptions that have been scanned, or otherwise. In some embodiments, the dosing information reflects a frequency of use (e.g., once a day, twice a day, before each meal, etc.) and a duration of use (e.g., a few days, a week, a few weeks, a month, etc.).

In some embodiments, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, and the like.

Figure 2:
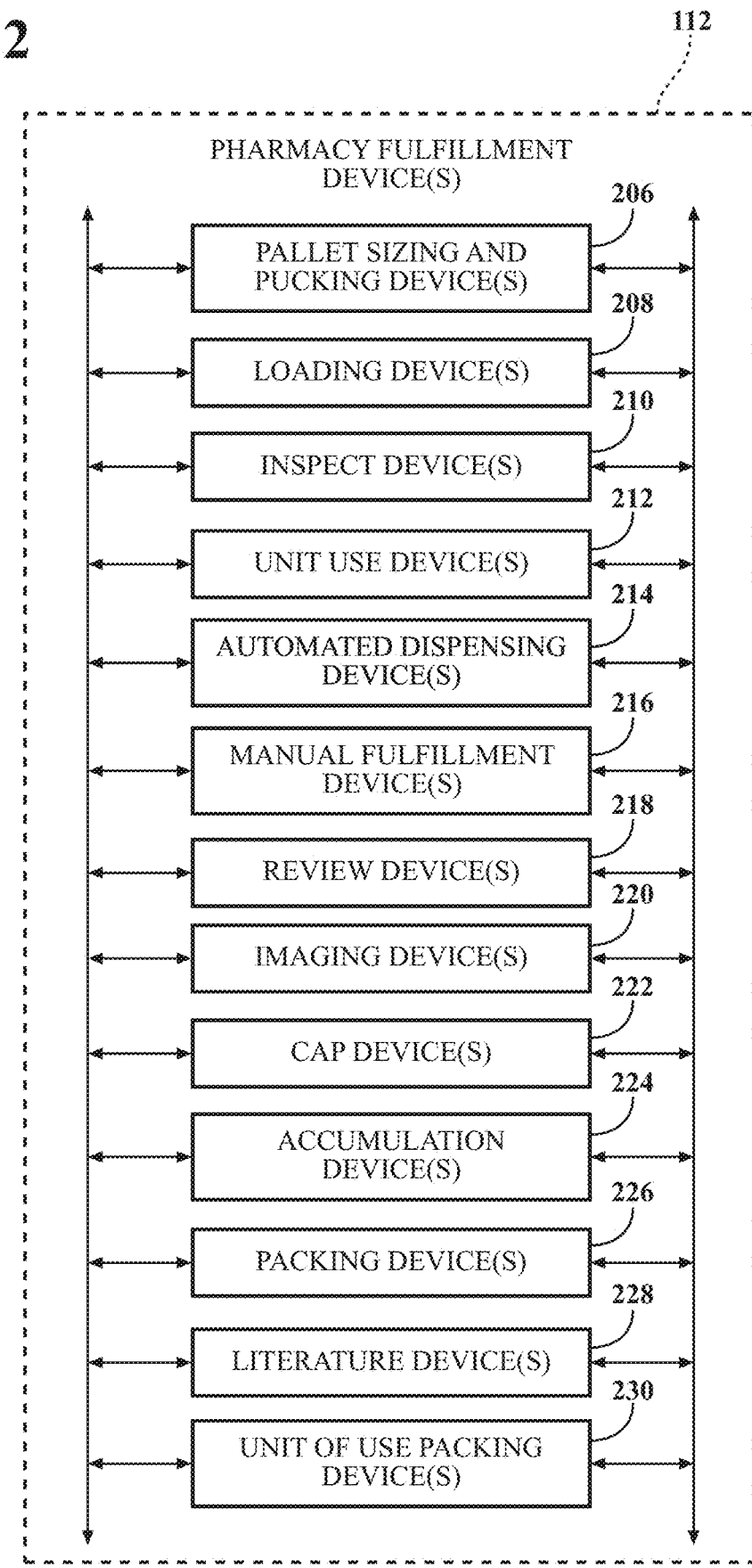
FIG. 2 is a block diagram of an example order processing device that may be deployed within the system of FIG. 1.

FIG. 2 illustrates the pharmacy fulfillment device 112, according to an example embodiment. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device, the order processing device 114, and/or the non-transitory storage 110, directly or over the network 104. Specifically, the pharmacy fulfillment device 112 may include pallet sizing and pucking device(s); loading device(s) 208; inspect device(s) 210, unit of use device(s) 212, automated dispensing device(s) 214, manual fulfillment device(s) 214, review device(s) 218, imaging device(s) 220, cap device(s) 222, accumulation device(s) 224, packing device(s) 226, and literature device(s) 228. Further, the pharmacy fulfillment device 112 may include additional devices, which may communicate with each other directly or over the network 104.

In some embodiments, operations performed by one or more of these devices 206-228 may be performed sequentially, or in parallel with the operations of devices as may be coordinated by the order processing device 114. In some embodiments, the order processing device 114 tracks a prescription with the pharmacy based on operations performed by one or more than one of the devices 206-228.

In some embodiments, the pharmacy fulfillment device 112 may transport prescription drug containers, for example, between more than one of the devices 206-228 in a high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet. At times a pucking device can include a robotic arm that can place a puck in a pallet with the puck being associated with a cylindrical bottle configured to receive a liquid drug (e.g., a split from a parent bottle) or a rectangular prism (or other 3D shape, e.g., polygonal prism, irregular prism or the like) bottle configured to receive a liquid drug (e.g., a split from a parent bottle).

The loading device 208 may load prescription containers into the pucks on a pallet by a robotic arm, a pick and place mechanism, or the like. In one embodiment, the loading device 208 has robotic arms or pickers to grasp a prescription container and move it to and from a pallet or to and from a puck. The loading device may also print a label that is appropriate for a container that is to be loaded onto the pallet and apply the label to the container. The pallet may be located on a conveyor assembly during these operations (e.g., at the high volume fulfillment center or the like).

The inspect device 210 may verify that containers in a pallet are correctly labeled and in the correct spot on the pallet. The inspect device 210 may scan the label on one or more than one container on the pallet. Labels of containers may be scanned or imaged in full or in part by the inspect device 210. Such imaging may occur after the container has been lifted out of its puck by a robotic arm, picker, or the like, or may be otherwise scanned or imaged while retained in the puck. In some embodiments, images and/or video captured by the inspect device may be stored in the storage device as a portion of the order data 118.

The unit of use device 212 may temporarily store, monitor, label, and/or dispense unit of use products. In general, unit of use products are prescription drug products that may be delivered to a patient or member without being repackaged at the pharmacy. These products may include pills in a container, pills in a blister pack, inhalers, liquids in a spray or other dispensing container, and the like. Prescription drug products dispensed by the unit of use device 212 may be packaged individually or collectively for shipping or may be shipped in combination with other prescription drugs dispensed by other devices (e.g., in the high-volume fulfillment center).

At least some of the operations of the devices 206-228 may be directed by the other processing device 114. For example, the manual fulfillment device 216, the review device 218, the automated dispensing device 214, the packing device 226, and/or another device may receive instructions provided by the order processing device.

The automated dispensing device 214 may include one or more than one device that dispenses prescription drugs or pharmaceuticals into prescription containers in accordance with one or multiple prescription orders. In general, the automated dispensing device 214 may include mechanical and electronic components with, in some embodiments, software and/or logic to facilitate pharmaceutical dispensing that would otherwise be performed in a manual fashion by a pharmacist and/or pharmacist technician. For example, the automated dispensing device 214 may include high volume fillers (HVFs) that fill a number of prescription drug types at a rapid rate and blister pack machines that dispense and pack drugs into a blister pack. Prescription drugs dispensed by the automated dispensing devices 214 may be packaged individually or collectively for shipping or may be shipped in combination with other prescription drugs dispensed by other devices in the high volume fulfillment center. The automated dispensing device 214 may include a counter to count medications from a hopper and dispense to a specified container through a dispensing door structure to stage and to guide the drug items to the specified container. The automated dispensing device 214 can also include a liquid dispensing device to insert liquid into the interior volume of the bottle.

The manual fulfillment device 216 may provide for manual fulfillment of prescriptions. For example, the manual fulfillment device 216 may receive or obtain a container and enable fulfillment of the container by a pharmacist or pharmacy technician. In some embodiments, the manual fulfillment device 216 provides the filled container to another device in the pharmacy fulfillment devices 112 to be joined with other containers in a prescription order for a patient or member. In general, a manual fulfillment may include operations at least partially performed by a pharmacist or a pharmacy technician. For example, a person may retrieve a supply of the prescribed drug, may make an observation, may count out a prescribed quantity of drugs and place them into a prescription container, or the like. Some portions of the manual fulfillment process may be automated by use of a machine. For example, counting of capsules, tablets, or pills may be at least partially automated (e.g., through use of a pill counter or the like). Prescription drugs dispensed by the manual fulfillment device 216 may be packaged individually or collectively for shipping or may be shipped in combination with other prescription drugs dispensed by other devices in the high-volume fulfillment center.

In the exemplary embodiment, the manual fulfillment device 216 also includes a bottle filling station where one or more bottles are entirely or partially manually filled with liquid medications. At the bottle filling station, one or more bottle measurement devices are provided to allow a user to very quickly and accurately dispense a measured amount of liquid into one or more bottles. In an example embodiment, a user at the manual fulfillment device 216 can use the bottle measurement device to very quickly and accurately divide a liquid medication from a single one hundred and eighty cubic centimeter (180 cc) bottle into two ninety cubic centimeter bottles (90 cc). The use of the bottle measurement device at the manual fulfillment device 216 is discussed in further detail below. In an example, the manual fulfillment device 216 can include a liquid splitting device as described in U.S. patent application Ser. No. 18/102,574, filed 27 Jan. 2023, which is hereby incorporated by reference.

The review device 218 may process prescription containers to be reviewed by a pharmacist for proper pill count, exception handling, prescription verification, and the like. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been cancelled, containers with defects, and the like. In an example embodiment, the manual review may be performed at the manual station.

The imaging device 220 may image containers prior to filling and/or after they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114, and/or stored in the storage device 110 as part of the order data 118.

The cap device 222 may be used to cap or otherwise seal a prescription container. In some embodiments, the cap device 222 may secure a prescription container with a type of cap in accordance with a patient preference (e.g., a preference regarding child resistance, a preference regarding built-in adherence functionality, or the like), a plan sponsor preference, a prescriber preference, or the like. The cap device 222 may also etch a message into the cap or otherwise associate a message into the cap, although this process may be performed by a different device in the high-volume fulfillment center.

The accumulation device 224 accumulates various containers of prescription devices in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218, at the high-volume fulfillment center. The accumulation device 224 may be used to group the prescription containers prior to shipment to the member or otherwise.

The literature device 228 prints, or otherwise generates, literature to include with prescription drug orders. The literature may be printed on multiple sheets of substrates, such as paper, coated paper, printable polymers, or combinations thereof. The literature printed by the literature device 228 may include information required to accompany the prescription drugs included in a prescription order, relating to prescription drugs in the order, financial information associated with the order (e.g., an invoice or an account statement, or the like).

In some embodiments, the literature device 228 folds or otherwise prepares the literature for inclusion with a prescription drug order (e.g., in a shipping container or the like). In some embodiments, the literature device 228 that prints the literature may be separate from the literature device that prepares the literature for inclusion with a prescription order.

The packing device 226, which is discussed in further detail below, packages prescription orders in preparation for shipping the order.

The pharmacy fulfillment device 112 in FIG. 2 may include single devices 206-228 or multiple devices 206-228 (e.g., depending upon implementation in a pharmacy). The devices 206-228 may be the same type or model of device or may be different device types or models. When multiple devices are present, the multiple devices may be of the same device type or models or may be a different device type or model. The types of devices 206-228 shown in FIG. 2 are example devices. In other configurations of the system 100, lesser, additional, or different types of devices may be included.

Moreover, multiple devices may share processing and/or memory resources. The devices 206-228 may be located in the same area or in different locations. For example, the devices 206-228 may be located in a building or a set of adjoining buildings. The devices 206-228 may be interconnected (e.g., by conveyors), networked, and/or otherwise in contact with one another or integrated with one another (e.g., at the high-volume fulfillment center), e.g., using a track on which shuttles move. In addition, the functionality of a device may be split among a number of discrete devices and/or combined with other devices.

Figure 3:
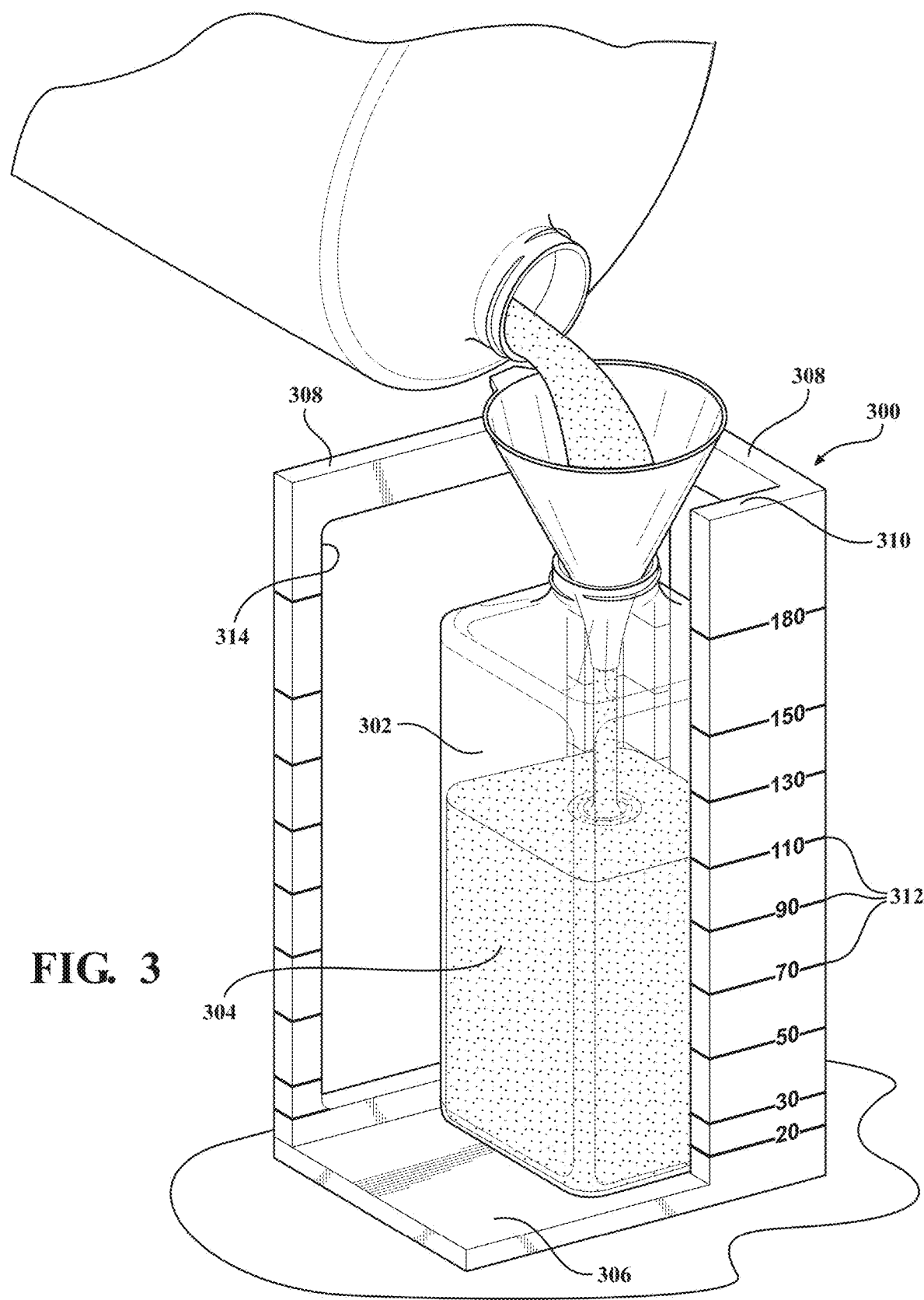
FIG. 3 is a perspective view illustrating the filling of a bottle in a jig constructed according to a first embodiment of the present disclosure.

Turning now to FIG. 3, an aspect of the present disclosure is related to a bottle measurement device, or jig 300, which is configured to allow a user to more quickly and accurately fill a medication bottle 302 with a liquid medication 304 to a desired level. In a first exemplary embodiment, the jig 300 has a rectangular floor 306, two full walls 308, and a partial wall 310 that together define a bottle receiving space. The walls 308, 310 extend vertically upwardly from the floor 306 to respective ends, i.e., the jig 300 does not have a top. The full walls and the partial wall are orthogonal to the floor. The full walls 308 extend the full lengths of their respective sides of the rectangular floor 306, and the partial wall 310 only extends along a portion of its respective side of the rectangular floor 306. As viewed from above, the walls 308, 310 generally form a "J" shape. Because the jig 300 lacks a wall on its fourth side and the partial wall 310 only extends for a portion of its side of the jig 300; thus defining an entry to allow a bottle to enter and be retrieved from the interior volume (i.e., the bottle receiving space) of the jig. This can allow a user to very quickly and easily place the bottle 302 into and remove the bottle 302 from the bottle receiving space.

In an example embodiment, the jig 300 is specifically designed and dimensioned for use with only a specific type of bottle 302. Accordingly, in a bottle filling station where different types (including different sizes) of bottles are to be filled with different and/or the same type of liquid medication, a plurality of differently constructed jigs will be present, one for each type of bottle. In an example embodiment, a jig may support two different bottles of different shapes. In the case of supporting the use of two or more bottles, the jig will have structures that will assist in ensuring that a specific bottle is associated with one set of indicia and line markings but not the second set of indicia and line markings.

All of the walls 308, 310 have indicia and line markings 312 that identify different fill levels for the specific type of bottle 302 that the jig 300 is constructed for use with. The indicia and markings 312 are permanently and prominently displayed on the walls 308, 310 so that the jig 300 remains permanently calibrated for filling the bottle 302. For example, in the exemplary embodiment of FIGS. 3, 4A, and 4B, the markings on the walls correlate to 20 mL, 30 mL, 50 mL, 70 mL, 90 mL, 110 mL, 130 mL, 150 mL, and 180 mL fill levels in the particular bottle 302 shown. In an example embodiment, the lower markings representing a lesser quantity of liquid in the bottle, are in smaller increments than higher markings representing the greater quantity of liquid in the bottle. In some embodiments, the specific markings may be correlated to more, fewer, and/or different fill levels from these specific measurements. Also, in some embodiments, the units of volume measurement on the indicia can be other units than milliliters, e.g., the units could be ounces, tablespoons, teaspoons, percentage of full (e.g., 100%, 75%, and 25%), etc. In an example, the indicia (line markings and alphanumerical) are not uniform in spacing or indication along the vertical direction of at least one wall or along multiple walls. The markings, e.g., the indicia and the lines, are inset, embossed or raised into the surface of one or more walls. In an example embodiment the markings are in at least two walls.

As illustrated, the bottle 302 has a transparent or semi-transparent outer wall such that the liquid medication 304 contained within the bottle 302 can be seen through the outer wall. In some embodiments, the outer wall of the bottle 302 has an amber color but the semi-transparency is preserved. Because the bottle 302 is transparent or semi-transparent, when the bottle 302 is in the bottle receiving space of the jig 300, the user can quickly compare the fluid level against the indicia and line markings 312 on the walls 308, 310 and determine the volume of the liquid medication 304 within the bottle 302. In the exemplary embodiment, the line markings 312 are present on both sides (an inside surface and an outside surface) of all of the walls 308, 310 so that the user can quickly determine the volume of the liquid medication 304 in the bottle 302 from basically any angle around the jig 300. In the first exemplary embodiment, the two full walls 308 also are provided with windows 314, and the line markings 312 extend into the sides of the windows 314 between the inner and outer surfaces of the full walls 308. The windows 314 cover most of the areas of the full walls 308 such that the user can view the medication level even through the full walls 308. The markings 312 can be made on the walls of the bottle measurement device through any suitable process, e.g., a writing utensil, an etching, etc. In some alternate embodiments, the line markings can be found on only some of the walls or some portions of the walls.

Figure 4A:
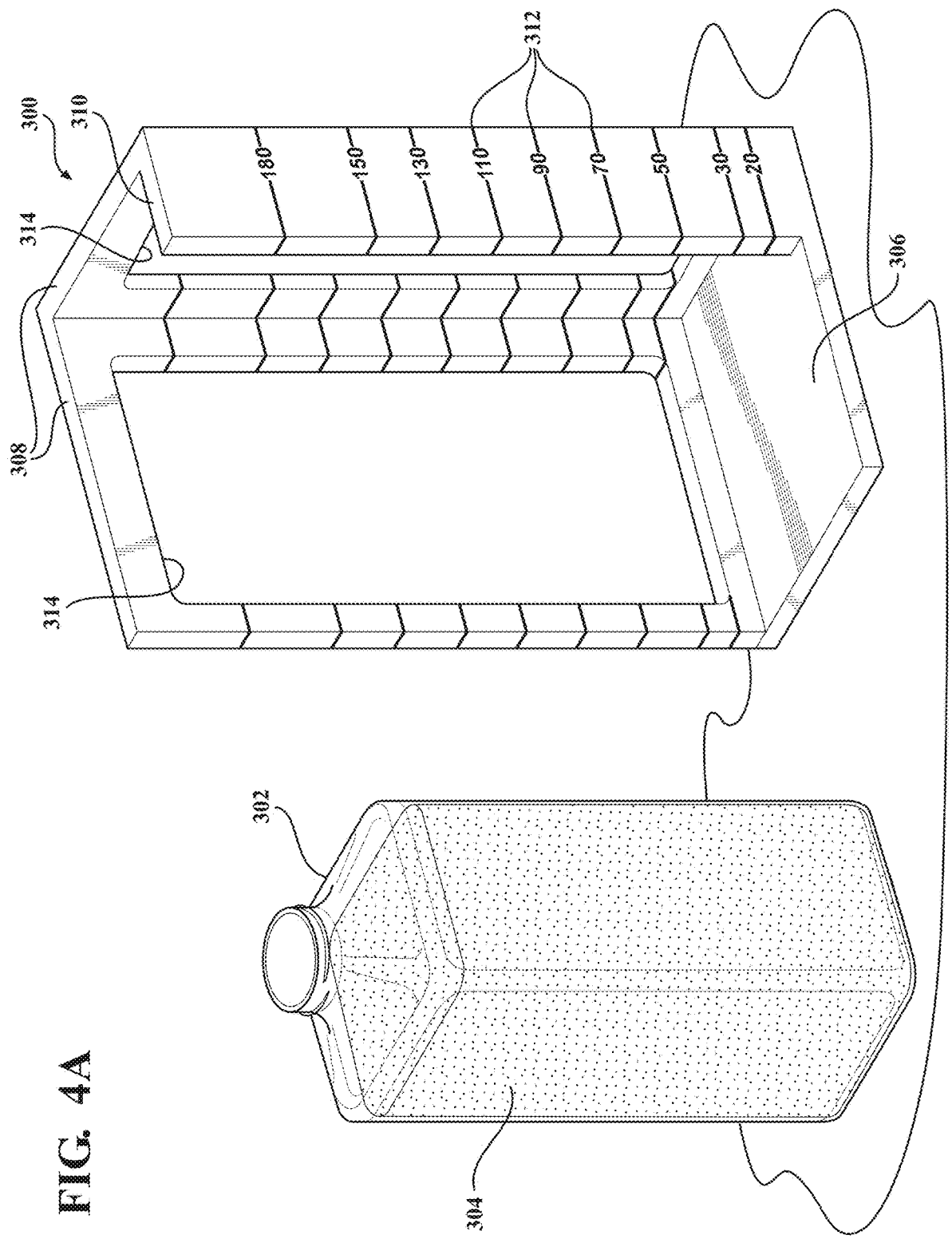
FIGS. 4A and 4B are perspective view illustrating a bottle adjacent the jig of FIG. 3 and another embodiment of the jig.
Figure 4B:
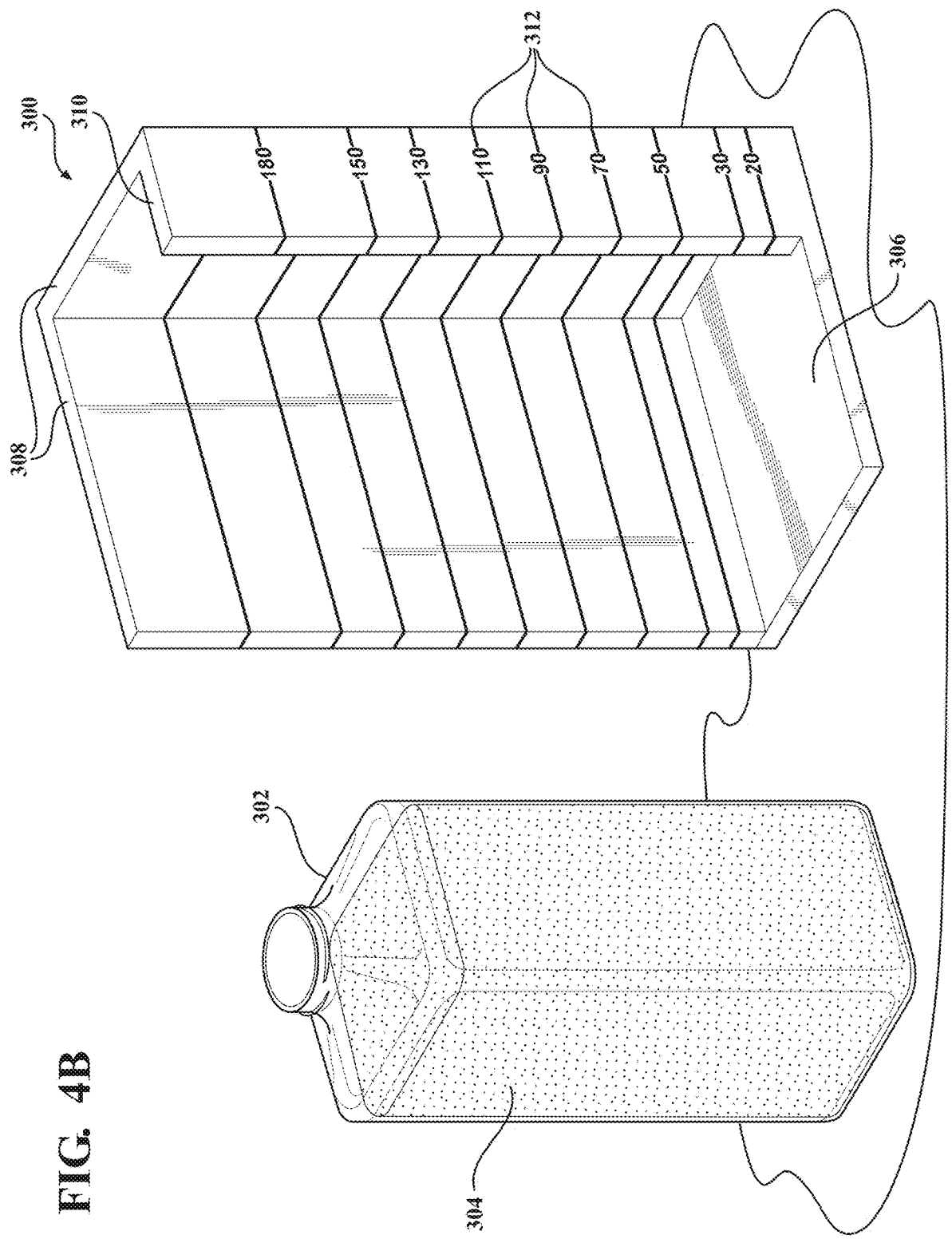

The embodiment of FIG. 4B is similar to the embodiment of FIG. 4A but the walls 308, 310 do not include windows 314 and the markings 312 extend the full widths of these walls 308, 310.

In the exemplary embodiment of FIGS. 3, 4A, and 4B, the bottle 302 has a square bottom, and fits snugly within the bottle receiving space that is established by the walls 308, 310. In other words, the inner periphery of the walls 308 of the jig 300 generally follow a portion of an outer perimeter of the bottle 302. Since there may be multiple jigs in the bottle filling area, this snug fit provides an indication to the user that the bottle 302 is being placed in the correct jig 300. In other words, if the user attempts to place a bottle into a jig that is configured for another type of bottle, the bottle may either be too large to fit within the bottle receiving space or it may fit within the confines of the three walls loosely (not snugly). Either way, the user is alerted that the he or she has chosen the incorrect jig.

In the exemplary embodiment, the jig 300 is constructed as a single, monolithic piece of a plastic material (e.g., a bio-resistant resin) and is shaped through an additive manufacturing process (e.g., 3D printing). However, some other embodiments, the jig can be made of other types of materials, including metals, elastomeric materials, ceramics, etc. The jig may be also shaped through any suitable process including, injection molding, other additive manufacturing processes, machining, etc. In some embodiments, the jig can be made of two or more pieces that are fixedly attached together. For example, in one alternate embodiment, a common floor can be fixedly attached with different wall configurations to provide the jog with differently sized and shaped bottle receiving areas.

Figure 5:
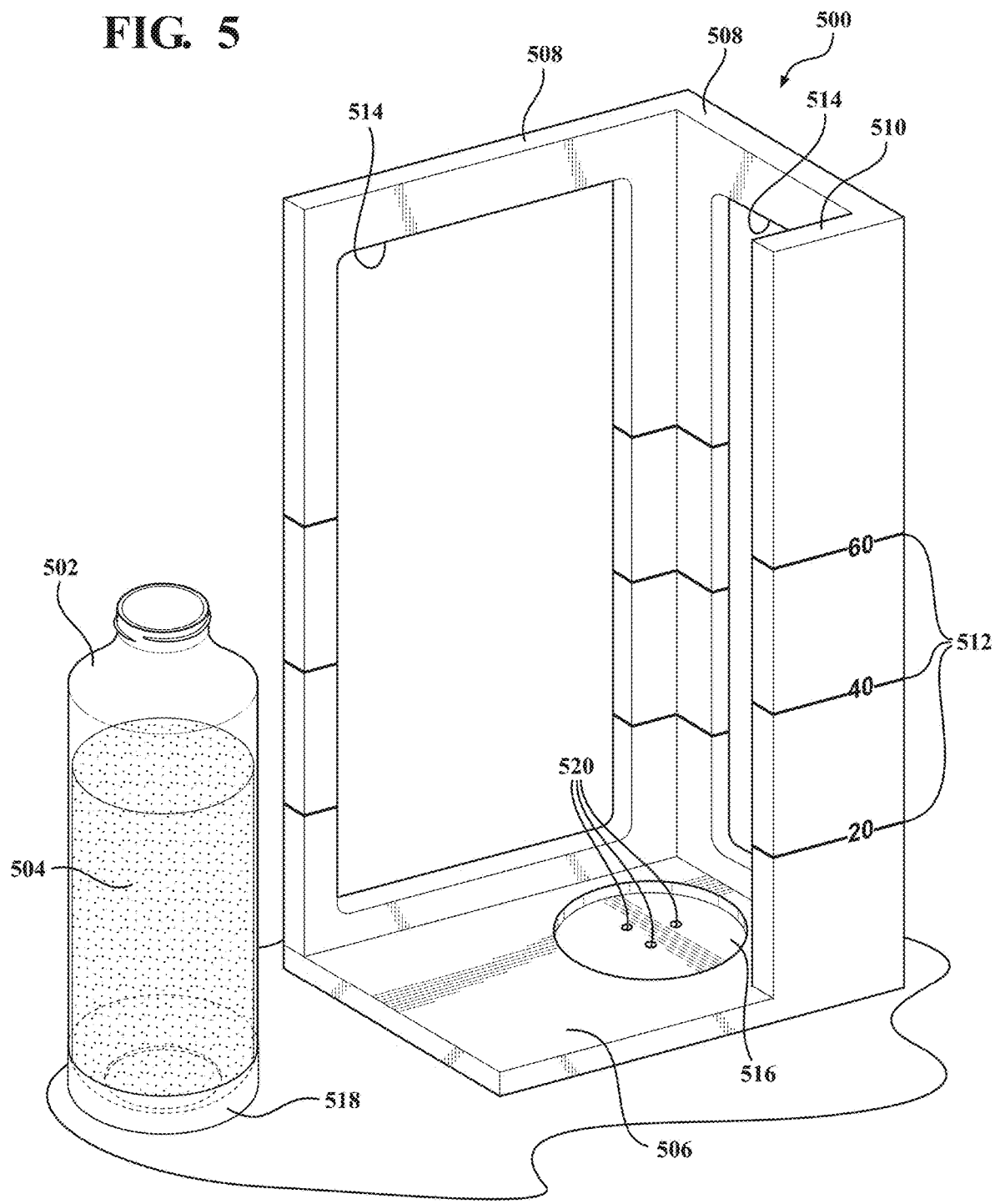
FIG. 5 is a perspective view illustrating a different type of bottle adjacent a second embodiment of the jig.
Figure 6:
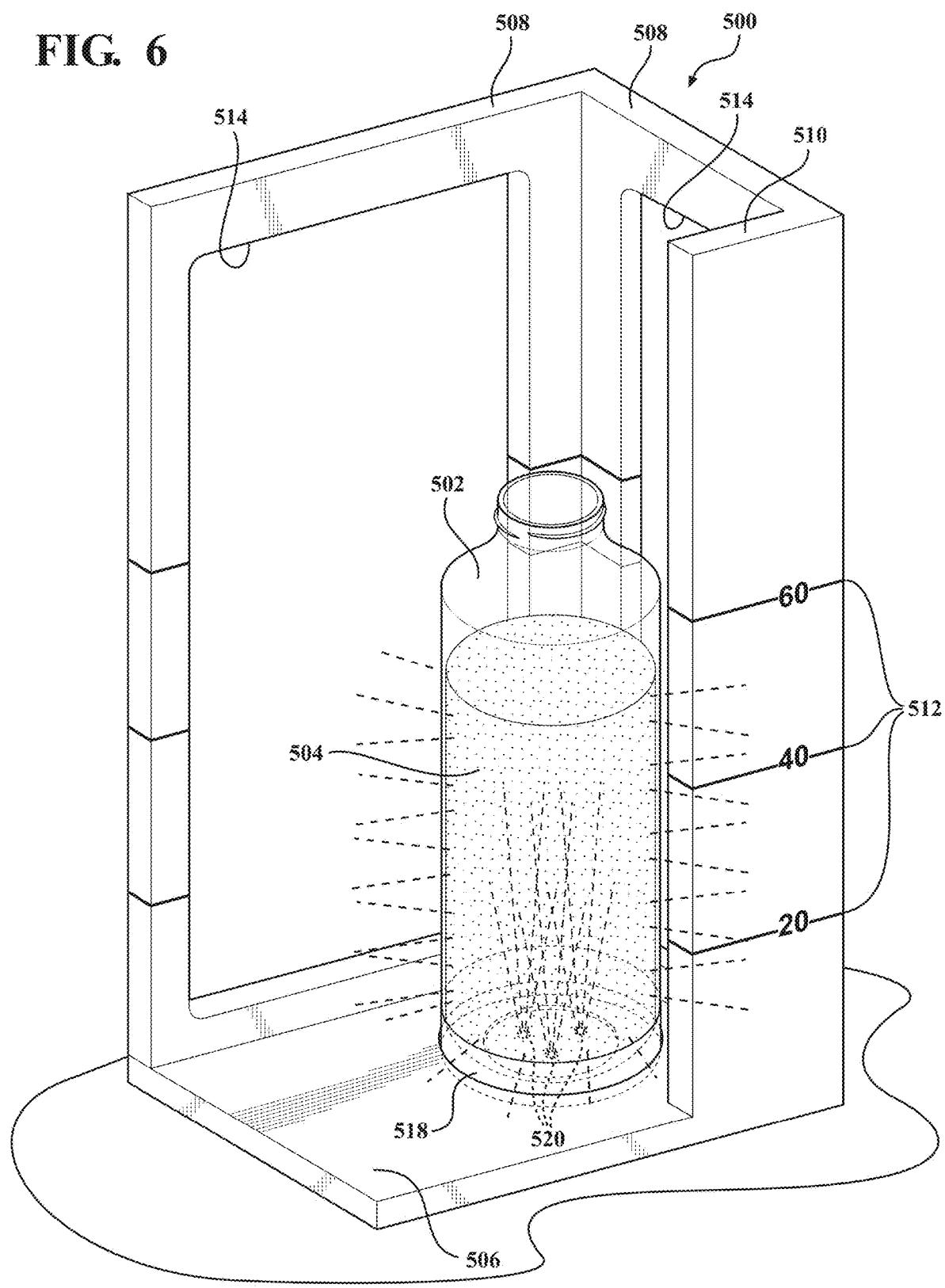
FIG. 6 is a bottle in the jig of FIG. 5 and with lights on the jig illuminating the liquid medication in the bottle.

Turning now to FIGS. 5 and 6, a second embodiment of the jig 500 is illustrated with like numerals, separated by a prefix of "5," identifying like components with the embodiment described above. The second embodiment of the jig 500 is similar to the first embodiment but is configured for use with a different type of bottle 502. More specifically, the jig 502 is configured for use with a generally cylindrical bottle 502 that has a circular, rather than rectangular, cross-sectional shape. To accommodate the circular shape of the bottle 502, the floor 506 has a circular recess 516, which has a diameter that is slightly larger than a diameter of the bottle 502 so that a bottom of the bottle 502 fits snuggly into the recess 516. Also, when the bottle 502 is received in the bottle receiving space of the jig 502, the walls 508, 510 either touch or nearly touch the outer wall of the bottle 502. In this embodiment, the bottle 502 has a bottom cap 518, and the circular recess 516 is shaped to receive the bottom cap 518. In embodiments where the bottle does not include a bottom cap, the vessel of the bottle is received within the circular recess.

Also in the second embodiment, the floor 506 of the jig 500 includes a plurality of light emitting diodes (LEDs) 520 for illuminating the medication 504 within the bottle 502 from beneath the bottle 502 to make the user's visual inspection of the fill level easier during the filling process. In some embodiments, the jig 500 may contain a power source (e.g., one or more batteries) for the LEDs 520. The LEDs 520 are located within the recess 516 on the floor 506 and emit light directly upwardly into the bottle 502. In some other embodiments, a different type of light source may be provided. Also, any suitable number of LEDs may be included to illuminate the liquid medication. For example, in some cases, more LEDs may be required to illuminate the liquid medication within an amber colored bottle and fewer LEDs may be required to illuminate the medication within a clear bottle. In some other embodiments, the jig can receive its power from an external source, e.g., a wall outlet.

Figure 7:
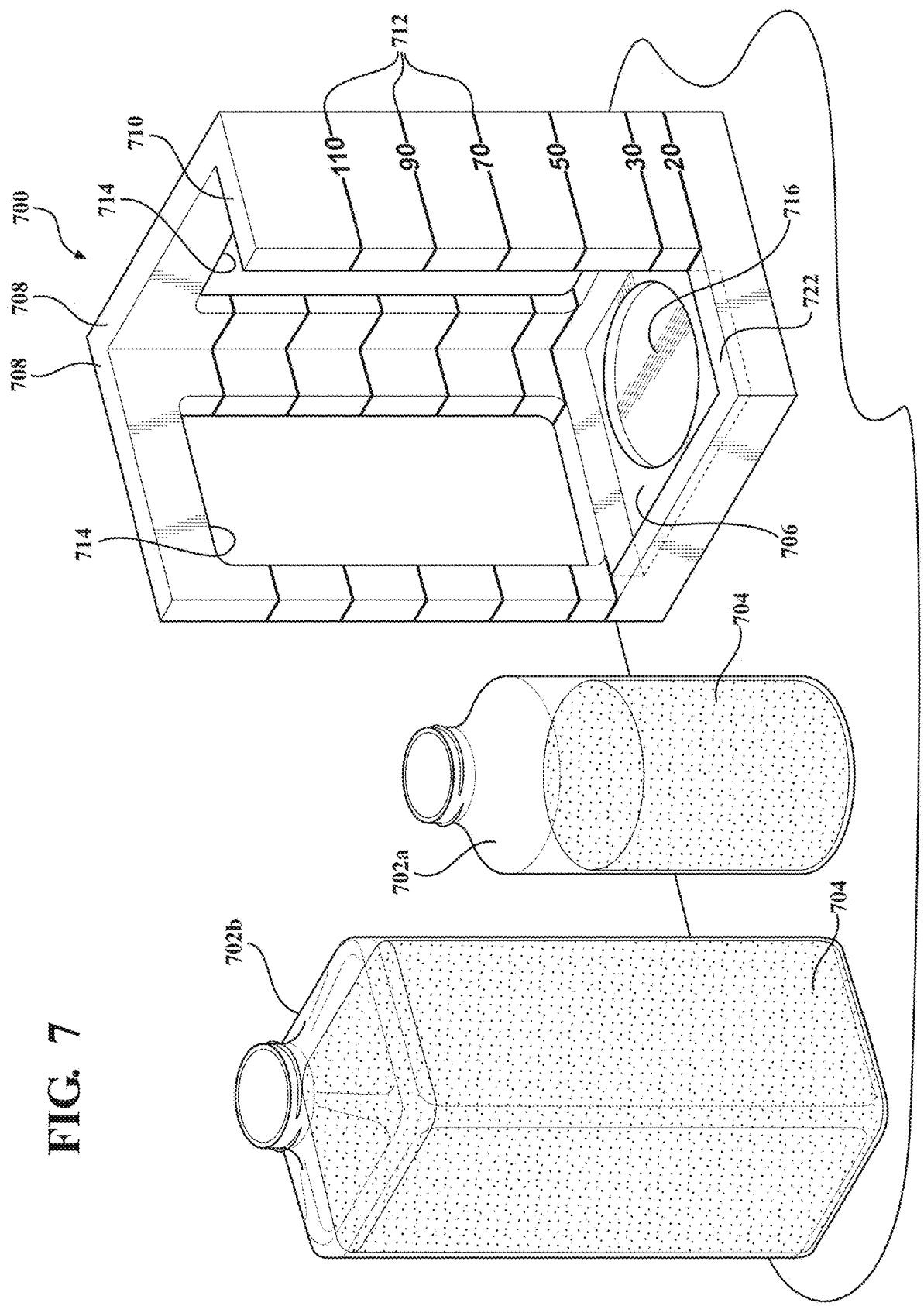
FIG. 7 is a perspective view illustrating a different type of bottle adjacent a third embodiment of the jig.

Turning now to FIG. 7, a third exemplary embodiment of the jig 700 is illustrated with like numerals, separated by a prefix of "7," identifying similar components with the embodiments described above. The jig 700 is similar to the first embodiment but is configured for accommodating two different types of bottles 702, namely, a circular bottle 702a and a rectangular bottle 702b. More specifically, a small ledge 722 runs along the periphery of the floor 306 in the areas where the walls 708, 710 are not present to further define the bottle receiving space and provide additional support to the rectangular bottle 702b when it is in the jig 700. In other words, the ledge 722 contributes to the snug fitting of the bottle 702b within the jig 700. A circular recess 716 is provided to define the bottle receiving space for the circular bottle 702a. The jig 700 can include one set of markings 712 if the same set of markings is accurate for both bottles or can include two sets of markings that are distinguished from one another (for example, with different colors) that are unique to the respective bottles 702a, 702b.

Figure 8:
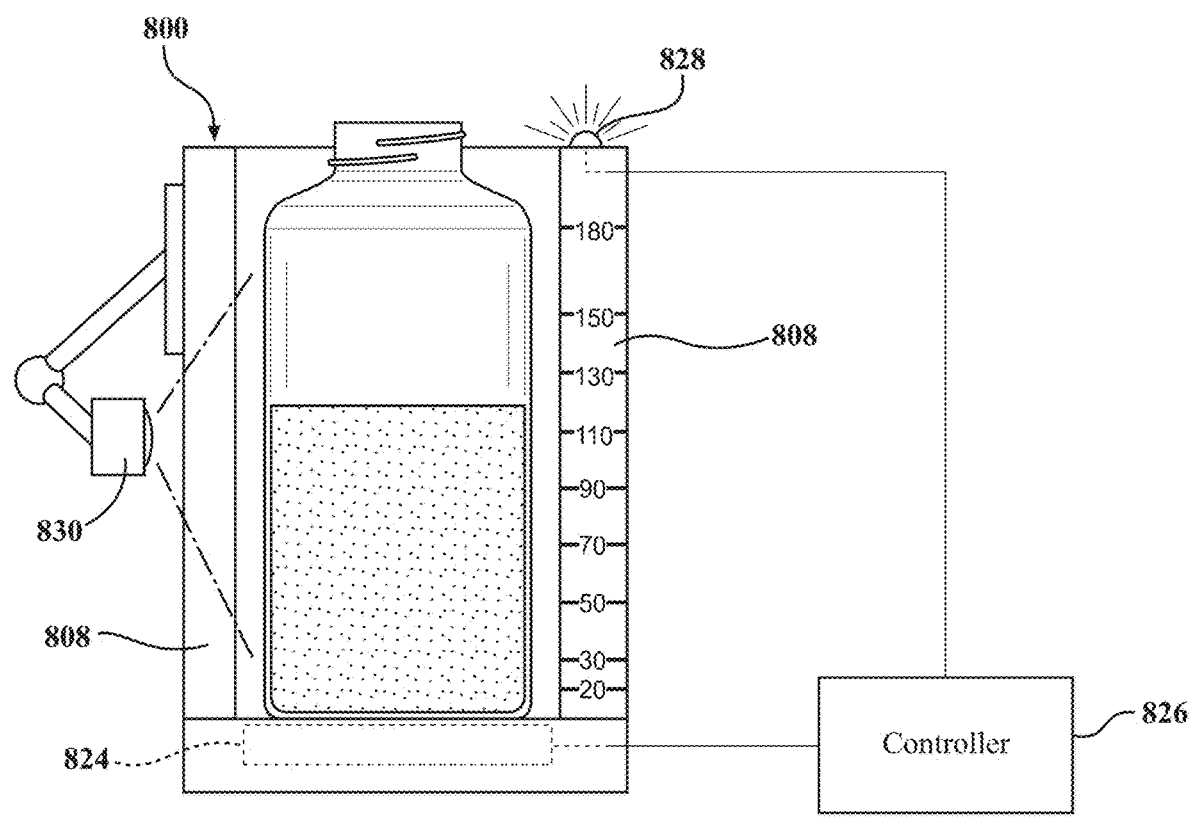
FIG. 8 is a schematic view illustrating fourth embodiment of the jig and a controller connected to a scale in the jig.

Turning now to FIG. 8, a fourth exemplary embodiment of the jig 800 is illustrated with like numerals, separated by a prefix of "8," identifying similar components with the embodiments described above. In this embodiment, the jig 800 includes a scale 824 that is integrated into the floor for weighing the bottle 802, including the liquid medication 804 contained therein, to supplement the visual inspection. In this embodiment, scale 824 is operably connected with a controller 826, which may be internal to the jig 800 or external of the jig 800, and supplies a weight measurement to the controller 826. The weight of the floor of the jig 800, the weight of any funnel or other device used to assist in the pouring, the empty weight of the bottle 802, the density of the liquid medication 804 being inserted into the bottle 802, and the desired final volume of the liquid medication 804 are all input into the controller 826. Using these known inputs, the controller 826 calculates a desired weight and in real time compares the weight being measured by the scale 824 to the desired weight. In response to the measured weight exceeding the desired weight, the controller 826 automatically triggers an alert to inform the user that the proper fill level has been reached. In the exemplary embodiment, the alert device 828 is a light that is separate from the LEDs on the floor. In some embodiments, the alert device could be, for example, a speaker that plays a sound when the desired fill level has been reached.

The jig 800 also includes an imager 830 (for example, a camera) that is attached with or disposed adjacent to one of the walls 808, 810. The imager 830 is in electrical communication with the controller 826 and can capture images before, during, and after the filling process. In some embodiments, using the images, the controller 826 can use the images, in addition to the scale 824 measurement, to determine the fill level of the bottle 804 during and after the filling operation. The images can also be saved to a database for documentation and long term storage.

In an example embodiment, the walls of the jig extend upwardly from the base and are orthogonal to the base. However, the walls do not completely encircle the periphery of the jig. For example, at least one wall does not completely fill its side; the length of the side of the jig is greater than the length of the corresponding wall. In another example, at least two adjacent walls do not extend the length of their respective sides. This will leave a vertically extending corner of the jig, defined by two adjacent walls, open such that the container can pass horizontally therethrough into he interior of the jig. The open corner can be more open on one side of the jig relative to the second side of the jig. In some use cases, e.g., shown in FIGS. 6 and 7, an entire side is missing at the corner in the foreground with the remaining wall being less than half the length of its side of the jig or less than a third the length of its side of the jig.

The present disclosure uses liquids as the contents within a container being measured by the present device and present systems. A liquid can be a flowable material, and has a definite volume but not a fixed shape. In an example the liquid is a solvent that contains a medication (the solute). In example of a solvent is water. Other solvents that are non-reactive to the medication and the container material are also within the scope of the present disclosure. In some other applications, the material within the container can be individual items, e.g., capsules, pills, tablets, other medication shapes, or the like, where the volume of the quantity of individual items is an indicator or measurement that is useful when reviewing the container and items therein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein may be realized in hardware, software, or any combination thereof. The hardware may include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module may include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module may include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module may include memory that stores instructions executable by a controller to implement a feature of the module.

Further, in one aspect, for example, systems described herein may be implemented using a special purpose computer/processor may be utilized which may contain hardware for carrying out any of the methods, algorithms, or instructions described herein. The hardware may become a special purpose device when storing instructions, loading instructions, or executing instructions for the methods and/ or algorithms described herein.

Further, all or a portion of implementations of the present disclosure may take the form of a computer program product accessible from, for example, a computer-usable or computer-readable medium. The program includes steps to perform, at least, portions of the methods described herein. A computer-usable or computer-readable medium may be any device that can, for example, tangibly contain, store, communicate, or transport the program for use by or in connection with any processor. The medium may be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under law.

What is claimed is:

1. A bottle measuring device for measuring a volume of a liquid medication in a bottle during a filling process, comprising:
   a jig including a floor and a fixed first wall, a second wall and a third wall each extending upwardly from the floor and partially surrounding a bottle receiving space, wherein the jig includes an open side not having a wall to allow the bottle to enter the jig laterally through the open side, wherein the first wall only partially extends a length of a side of the jig and leaves a portion of a side of the bottle in the jig uncovered in addition to the open side; and
   a plurality of measurement markers spaced vertically apart from one another in numeric increments on the first wall to indicate a fill level of the bottle adjacent an end of the first wall with the bottle in the bottle receiving space of the jig.

2. The bottle measuring device as set forth in claim 1, wherein the floor of the jig includes at least one light for illuminating the liquid medication in the bottle during the filling process.

3. The bottle measuring device as set forth in claim 1, wherein the floor has a rectangular shape, wherein the first wall, the second wall, and the third wall are planar and arranged along and extending vertically upwardly from a respective portion of a periphery of the floor, and wherein the jig includes an open top at the first wall and above the floor through which an open top of the bottle supported on the floor is uncovered.

4. The bottle measuring device as set forth in claim 3, wherein the second wall and the third wall are full walls that extend along full lengths of respective sides of the floor and the first wall that extends along a partial length of a respective side of the floor different than the second wall and the third wall.

5. The bottle measuring device as set forth in claim 4, wherein the second wall and the third wall include windows to allow the bottle to be viewed through the full walls.

6. The bottle measuring device as set forth in claim 5, wherein the measurement markings are located on all of the walls.

7. The bottle measuring device as set forth in claim 6, wherein the floor of the jig has a recess that has similar dimensions to a bottom of the bottle.

8. The bottle measuring device as set forth in claim 7, wherein the jig further includes a ledge that extends vertically upwardly from the floor and surrounds a portion of the floor that does not include the walls.

9. The bottle measuring device as set forth in claim 1, wherein the floor of the jig further includes a scale.

10. The bottle measuring device as set forth in claim 9, wherein the scale is in electrical communication with a controller and wherein the controller is configured to automatically trigger an alert on an alert device in response to a weight on the scaling equaling or exceeding a desired weight associated with the bottle when the bottle is filled with the liquid medication to a predetermined level.

11. A method of filling a medication bottle with a liquid medication, comprising the steps of:
   laterally inserting an empty bottle into a bottle receiving space of a jig through an open side of the jig, the jig having a floor and a fixed first wall, a second wall and a third wall each extending upwardly from the floor and partially surrounding the bottle receiving space with the first wall only partially covering the bottle, and a plurality of measurement markers spaced vertically apart from one another in numeric increments on the first wall to indicate a fill level of the bottle when the bottle is in the bottle receiving space of the jig;
   pouring the liquid medication into the bottle in the bottle receiving space of the jig through and open top; and
   comparing a fluid level of the liquid medication to the plurality of measurement markers on the first wall to determine a volume of the liquid medication in the bottle.

12. The method as set forth in claim 11, wherein the floor includes at least one light, and further including the step of:
   projecting light through a bottom of the bottle to illuminate the liquid medication in the bottle.

13. The method as set forth in claim 11, wherein the floor has a rectangular shape with four sides, and wherein the second wall and the third wall extend along the entire length of respective sides of the floor, and wherein the first wall extends along a portion of another respective side of the floor.

14. The method as set forth in claim 11, wherein the floor includes a recess that has a similar profile to a bottom of the bottle.

15. A pharmacy, comprising:
   a bottle filling area;
   at least one jig in the bottle filling area, the jig having a floor and a fixed first wall, a second wall and a third wall each extending upwardly from the floor and partially surrounding the bottle receiving space, and a plurality of measurement markers and spaced vertically apart from one another in numeric increments on the first wall to indicate a fill level of the bottle when the bottle is laterally received in the bottle receiving space of the jig wherein the first wall only partially extends a length of a side of the jig and leaves a portion of a side of the bottle in the jig uncovered; and
   at least one bottle in the bottle filling area, the bottle being shaped to be laterally received in the bottle receiving space through an opening not defined by the second wall and the third wall.

16. The pharmacy as set forth in claim 15, wherein the floor of the jig includes at least one light for illuminating the liquid medication in the bottle during the filling process.

17. The pharmacy as set forth in claim 15, wherein the floor has a rectangular shape and the firs wall, the second wall and the third wall are planar walls arranged along and extending vertically upwardly from a respective portion of a periphery of the floor.

18. The pharmacy as set forth in claim 17, wherein the second wall and the third wall are full walls that extend along full lengths of respective sides of the floor and the first wall that extends along a partial length of a respective side of the floor.

19. The pharmacy as set forth in claim 18, wherein the measurement markings are located on all of the walls.

20. The pharmacy as set forth in claim 15, wherein the floor of the jig includes a scale, and
   wherein the scale is in electrical communication with a controller and wherein the controller is configured to automatically trigger an alert on an alert device in response to a weight on the scaling equaling or exceeding a desired weight associated with the bottle when the bottle is filled with the liquid medication to a predetermined level.

* * * * *